(No Model.) 2 Sheets—Sheet 1.

T. JAMES.
DISCHARGE VALVE FOR BLOWING ENGINES.

No. 490,146. Patented Jan. 17, 1893.

WITNESSES.
C. Byrnes
N. M. Corwin

INVENTOR.
Thomas James
by W. Bakewell & Sons
his attorneys (No Model.) 2 Sheets—Sheet 2.

T. JAMES.
DISCHARGE VALVE FOR BLOWING ENGINES.

No. 490,146. Patented Jan. 17, 1893.

WITNESSES

INVENTOR
Thomas James
by W. Bakewell & Sons
his Attorneys.

UNITED STATES PATENT OFFICE.

THOMAS JAMES, OF BRADDOCK, ASSIGNOR TO THE SOUTHWARK FOUNDRY AND MACHINE COMPANY, OF PHILADELPHIA, PENNSYLVANIA.

DISCHARGE-VALVE FOR BLOWING-ENGINES.

SPECIFICATION forming part of Letters Patent No. 490,146, dated January 17, 1893.

Application filed August 22, 1891. Serial No. 403,387. (No model.)

*To all whom it may concern:*

Be it known that I, THOMAS JAMES, of Braddock, in the county of Allegheny and State of Pennsylvania, have invented a new and useful Improvement in Discharge-Valves for Blowing-Engines, of which the following is a full, clear, and exact description, reference being had to the accompanying drawings, in which—

Figure 1:
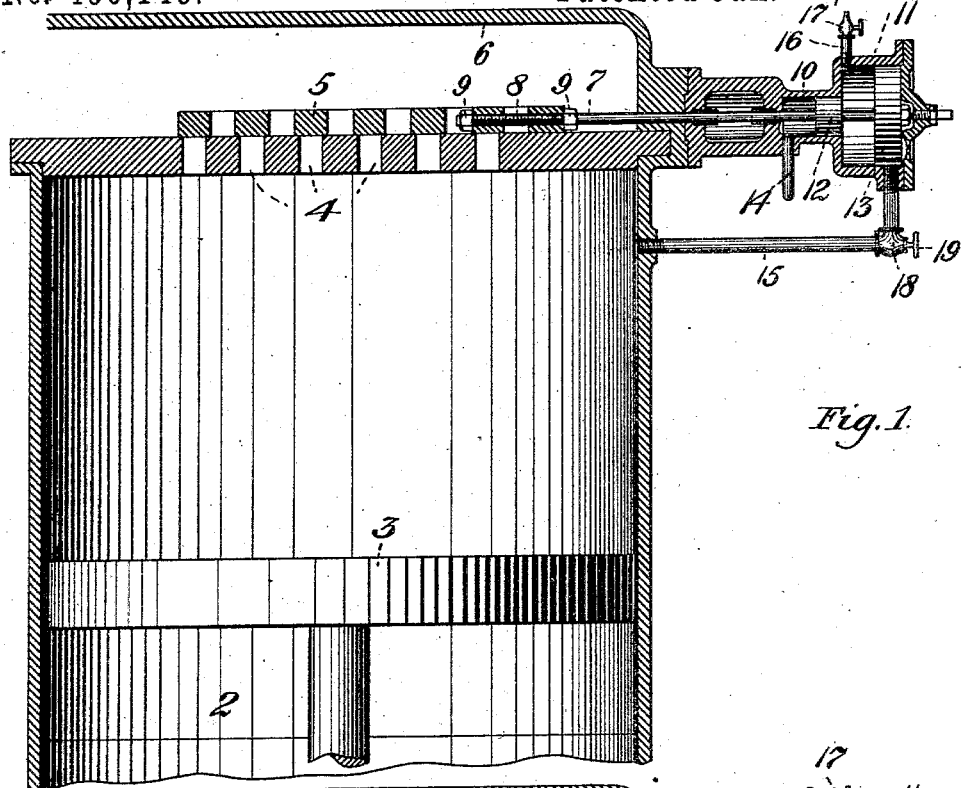
Figure 2:
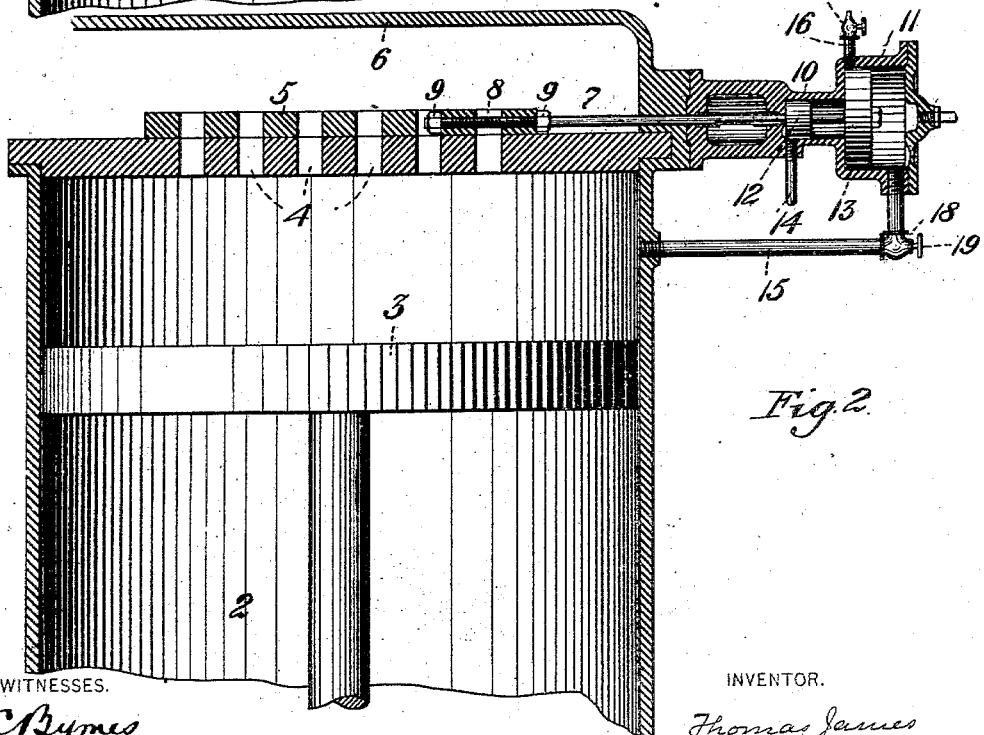
Figure 3:
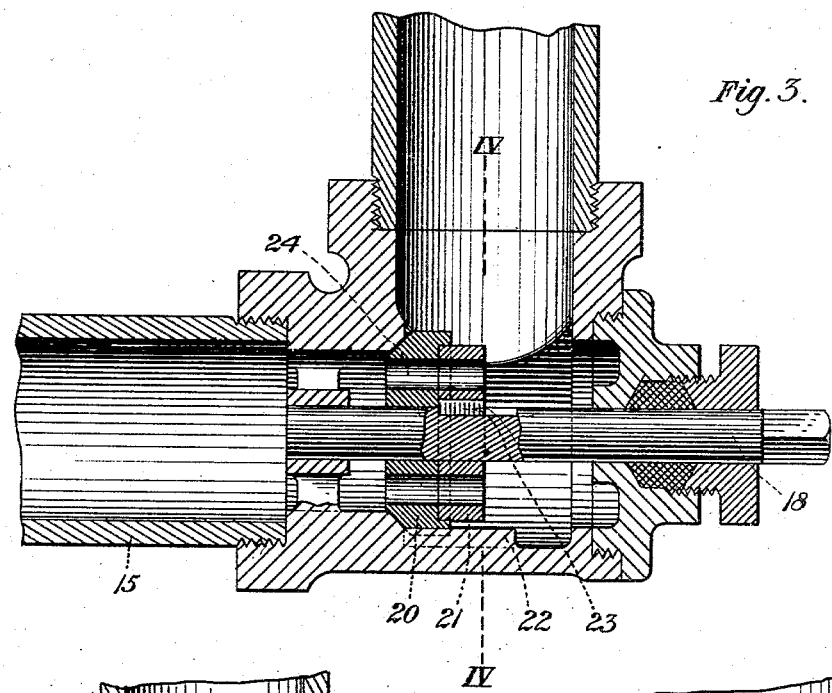
Figure 4:
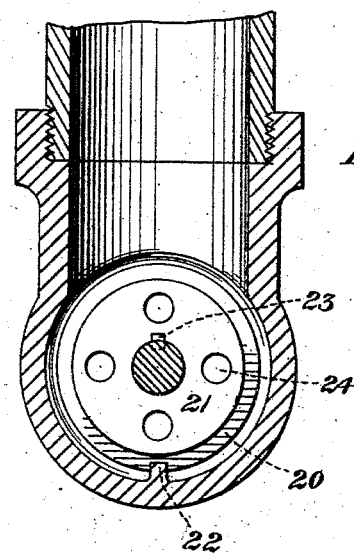
Figure 5:
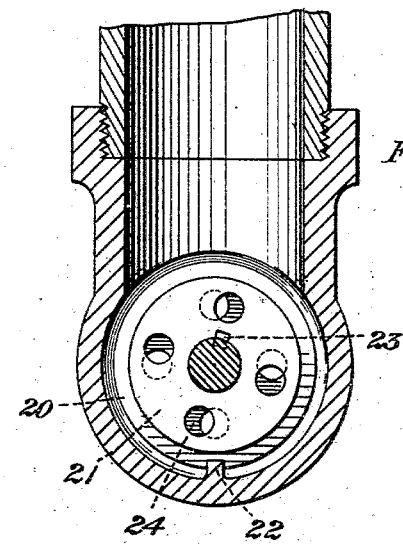

Figure 1 is a vertical section of a blowing-cylinder provided with my improved valve; Fig. 2 is a similar view, showing the discharge valve in another position. Fig. 3 is a detail sectional view of the automatic valve. Fig. 4 is a cross-section of Fig. 3, on the line IV—IV; and Fig. 5 is a similar view with the parts in a different position.

My invention relates to the discharge valve of blowing engines, and is designed to produce an automatic valve which instantly opens when the pressure in the cylinder exceeds a determined pressure, and closes again when the pressure in the cylinder falls below such pressure.

In the drawings, 2 is the engine cylinder, and 3 the piston reciprocating therein. In the upper end of the cylinder is provided a series of exit ports 4 over which slides the discharge-valve 5 having a corresponding series of ports therein. This valve 5 moves inside of the blast-receiver 6 to which the end of the cylinder is secured. The valve-stem 7 is adjustably connected with the discharge-valve by the threaded portion 8 and locking nuts 9, and extends through the side of the blast receiver, and through two small cylinders 10 and 11 of different sizes. Rigidly attached to the valve-stem and moving in the cylinders 10 and 11, respectively, are the two pistons 12 and 13. A steam pipe 14 enters one end of the cylinder 10, and a branch pipe 15 leads from the blowing cylinder to the outer end of cylinder 11, a small pipe 16, provided with a pet cock 17, being inserted in the inner end of the cylinder 11. Upon the valve-stem 18 is arranged an automatic valve, consisting of two disks 20 and 21, the disk 20 having a valve-seat thereon and being splined upon a longitudinal rib 22 in the casing, while the disk 21 is splined upon the stem as shown at 23. The two disks are provided with a series of registering openings 24, which, by turning the shaft or stem 18 may be changed in their relation to each other, since the disk 20 is held from turning by the spline upon the interior of the casing. Thus, when the air passes from the blowing-cylinder to the cylinder 11, the valve is forced back, both disks sliding freely upon the stem, thus allowing free passage of the air and causing the valve 5 to open instantly; but when the air is exhausted from the cylinder 11 into the blowing engine, the valve is drawn against its seat and the air passes only through the holes, the size of such holes being regulated by turning the stem 18 by its handle 19, thus rotating the disk 21.

The action is as follows: The parts being in the position shown in Fig. 1, with the piston rising, when the pressure of the air which is being compressed above the piston exceeds the pressure of the steam in the cylinder 10, such pressure by the branch pipe 15 instantly actuates the piston 13 and opens the valve 5, allowing the compressed air to enter the blast reservoir. This action continues until the piston reaches the upper end of its stroke, when the pipe 15 is uncovered, the pipe entering the cylinder below the end a distance slightly greater than the thickness of the piston, and the compressed air within the cylinder 11 is exhausted into the cylinder 2, thereby allowing the steam pressure in the pipe 14 to again close the valve 5, which remains closed until the piston again reaches the point upon its upstroke, at which the pressure above the piston exceeds the steam pressure in the pipe 14, when the valve again opens. By adjusting the cock 17, the proper size of exit is obtained for supplying a cushioning or dash pot action to the cylinder 11, while upon the back stroke of the piston 10 the steam is compressed within the pipe 14.

It is evident that by changing the relative sizes of the pistons 12 and 13, the point at which the valve will open can be nicely regulated.

Many other changes in the shape and arrangement of the parts may be made without departure from my invention, which I regard as lying broadly in the automatic valve having a rod provided with two pistons, one actuated by a constant pressure from an independent source, and the other by a pipe connected with the blowing-cylinder.

The advantages of my invention obviously reside in the entirely automatic action of the valve, the non liability to getting out of order, and the surety of the valve action.

What I claim is,—

1. A cylinder provided with a discharge valve, two oppositely acting pistons connected with said valve, a branch connection from the cylinder arranged to actuate one piston, and a branch connection communicating with an independent source of constant pressure arranged to actuate the other piston; substantially as and for the purposes described.

2. A blowing-cylinder having a discharge-valve, the stem of which valve extends through two cylinders, a piston secured to the valve-stem in each cylinder, a branch connection leading from an independent source of constant pressure to one cylinder, and a branch pipe leading from the blowing cylinder to the other cylinder; substantially as and for the purposes described.

3. The combination with a blowing-cylinder and its discharge-valve, of two pistons secured to the valve-rod, two cylinders within which said pistons operate, a branch connection leading from an independent source of constant pressure to one cylinder, a branch pipe leading from the blowing-cylinder to one end of the second cylinder, and an open-ended valve controlled pipe connected to the other end of said second cylinder; substantially as and for the purposes described.

4. The combination with a blowing-cylinder and its discharge-valve, of two pistons secured to the valve rod, two cylinders within which said pistons operate, a branch connection leading from an independent source of constant pressure to one cylinder, and a branch pipe leading from the side of the blowing-cylinder at a distance from its end slightly greater than the thickness of the piston and connected to the other cylinder; substantially as and for the purposes described.

5. The combination with a blowing-cylinder and its discharge-valve, of two pistons of different diameters secured to the valve-rod, two cylinders within which the pistons operate, a branch connection leading from an independent source of constant pressure to one cylinder, and a branch pipe leading from the blowing-cylinder to the other cylinder; substantially as and for the purposes described.

6. A blowing-cylinder, having a discharge-valve, two pistons secured to the valve-stem, cylinders within which such pistons operate, a supply-pipe leading from a source of constant pressure to one of said cylinders, a branch pipe connecting the blowing cylinder with the other of said cylinders, and an automatic check-valve in said branch pipe; substantially as and for the purposes described.

In testimony whereof I have hereunto set my hand this 19th day of August, A. D. 1891.

THOMAS JAMES.

Witnesses:
DAVID S. McCANN,
H. M. CORWIN.